United States Patent [19]

Beach

[11] Patent Number: 6,067,297
[45] Date of Patent: May 23, 2000

[54] EMBEDDED ACCESS POINT SUPPORTING COMMUNICATION WITH MOBILE UNIT OPERATING IN POWER-SAVING MODE

[75] Inventor: Robert Beach, Los Altos, Calif.

[73] Assignee: Symbol Technologies, Inc., Holtsville, N.Y.

[21] Appl. No.: 08/672,581

[22] Filed: Jun. 28, 1996

[51] Int. Cl.$^7$ ...................................................... H04J 3/24
[52] U.S. Cl. ........................................... 370/389; 370/311
[58] Field of Search ..................... 370/230, 256, 370/312, 313, 328, 331, 334, 338, 401, 412, 447, 310, 311, 318, 320, 324, 332, 335, 336, 342, 341, 346, 347, 350, 349, 465, 402, 389, 428, 480, 449, 390, 216; 375/200, 202; 455/436, 439, 422, 432, 434, 38.3, 38.2, 515, 522

[56] References Cited

U.S. PATENT DOCUMENTS

| | | |
|---|---|---|
| 4,639,914 | 1/1987 | Winters . |
| 4,672,658 | 6/1987 | Kavehrad et al. . |
| 4,789,983 | 12/1988 | Acampora et al. . |
| 5,029,183 | 7/1991 | Tymes . |
| 5,030,807 | 7/1991 | Landt et al. . |
| 5,046,066 | 9/1991 | Messenger . |
| 5,055,659 | 10/1991 | Hendrick et al. . |
| 5,128,938 | 7/1992 | Borras ..................................... 455/343 |
| 5,241,542 | 8/1993 | Natarajan et al. . |
| 5,422,816 | 6/1995 | Sprague et al. . |
| 5,440,559 | 8/1995 | Gaskill . |
| 5,528,583 | 6/1996 | Acampora et al. ...................... 370/256 |
| 5,539,925 | 7/1996 | Yli-Kotila et al. ...................... 370/311 |
| 5,546,397 | 8/1996 | Mahany ................................. 370/85.1 |
| 5,572,528 | 11/1996 | Shuen ..................................... 370/402 |
| 5,654,959 | 8/1997 | Baker et al. ............................ 370/331 |
| 5,724,346 | 3/1998 | Kobayashi et al. ..................... 370/401 |

*Primary Examiner*—Dang Ton
*Attorney, Agent, or Firm*—Fish & Richardson P.C.

[57] ABSTRACT

A wireless communication system, in particular a wireless LAN includes at least two mobile units, one of the mobile units including an adapter card configured to support embedded access point capability and including an association table for retaining status information concerning other mobile units in the network and message transmit queues allowing the system to operate in power saving polling mode. According to another aspect the invention relates to a wireless communication system including roaming mobile units wherein, when a mobile unit roams from a first access point to a second access point, the first access point only becomes aware of the roam once the mobile unit has transmitted a packet on to the backbone.

21 Claims, 5 Drawing Sheets

ASSOCIATION TABLE

| ENTRY | LINK POINTER 40 | STATUS FIELD 41 | | | MU IEEE ADDRESS 42 | PSP QUEUE POINTER 43 | PSP STATION NO. 44 | TRANSMIT STATUS 45 | (T)LAST INTERACTION 46 | (N)TX FAILS 47 |
|---|---|---|---|---|---|---|---|---|---|---|
| | | IN USE 41a | PSP CAM 41b | TRANSMIT OK 41c | | | | | | |
| #1 | | | | | | | | | | |
| #2 | ... | ... | ... | ... | ... | ... | ... | ... | ... | ... |
| #3 | | | | | | | | | | |
| #4 | | | | | | | | | | |
| #5 | | | | | | | | | | |

FIG. 5

EMBEDDED ACCESS POINT SUPPORTING COMMUNICATION WITH MOBILE UNIT OPERATING IN POWER-SAVING MODE

BACKGROUND OF THE INVENTION

1. Field of the Invention

The invention relates generally to an embedded access point, in particular an embedded access point for use in association with mobile units in a wireless communications network.

2. Description of the Related Art

Wireless communication networks such as wireless local area networks (WP) are used in many applications such as inventory, package tracking, portable point of sale and so forth. Generally the operator will carry a mobile unit such as a hand-held computer which communicates with a host computer via one of a plurality of access units (or access points) connected to the host computer. Many of the systems that have been developed are proprietary and in order to achieve inter-operability of the various systems a standard IEEE 802.11 has been established.

The concept of "roaming" mobile units has also been addressed in the prior art. Where a mobile unit is portable and communicates via, for example, radio frequency communication, the unit may be transported out of range of a given access unit or at least to a location where it is within range of more than one access unit. In either case it is desirable for the mobile unit to have the option of selecting which access unit it should associate with on the basis of the strength of signal received from different access units.

The IEEE 802.11 protocol supports either direct sequence or frequency hopping spread spectrum systems, as well as infrared communications. For the purposes of the present discussion, frequency hopping spread spectrum communication will be concentrated on. Each access unit executes a unique hopping pattern across a given number, conventionally 79, of non-overlapping frequencies at a rate of one hop every one hundred milliseconds. Sixty six hopping patterns are specified in the IEEE 802.11 protocol and are selected to minimise the possibility of interference.

In order for a mobile unit to associate with an access unit the mobile unit follows an association protocol. The mobile unit firstly sends out a probe packet having no destination address which is accordingly accepted by all access units within range. The probe packet contains an identifying address for the mobile unit which has sent it. The access unit then transmits a probe response packet which includes information such as the access unit address, the hopping pattern, the present channel, time left in the present channel and other timing information. The mobile unit then decides whether or not to associate with a given access unit, based on for example the strength of the signal of the access unit and any information the access unit may have issued indicating how many mobile units are already associated with it. If the mobile unit decides to associate, it sends an associate message or packet and the access unit decides whether to accept the association request and issues an association response after the request is accepted.

In addition the access unit transmits a "beacon" at predetermined intervals containing, in addition to other information, timing information similar to that contained in the probe response packet.

The mobile units can operate in two power management modes, either continuously awake mode (CAM) or power save polling (PSP) mode. In the former mode, CAM, the mobile unit remains in substantially continuous communication with an access unit so as to receive and transmit all information intended for the mobile unit practically instantaneously. Of course that mode of operation requires a high level of power consumption which is not always desirable for a portable mobile unit which is relying on internal power such as batteries. In the alternative PSP mode the mobile unit sends out a polling signal at predetermined intervals of time to enquire whether an associated access unit has stored any messages for that mobile unit in a suitable buffer. Similarly the mobile unit can store any messages to be transmitted in a buffer and transmit all of the messages so stored at predetermined intervals. Such a mode of operation clearly allows decreased power consumption. Under the IEEE 802.11 protocol the beacon signal contains information about which PSP stations have data waiting.

A standard access unit or access point (AP) can support wireless communication with up to 128 mobile units. The standard AP also communicates with a wired Ethernet backbone, performing a bridging function between the wired and wireless sides. The standard AP has a serial port to allow monitoring of network operation.

The conventional system is highly efficient and reliable, but in certain cases may prove very costly for the desired application. For example certain configurations require a very small number of mobile units (MU), perhaps one or two, and a data transfer rate which is correspondingly low, perhaps 10 to 20 KB/sec. These configurations include truck based systems and low end non-mall configurations such as convenience stores. In these environments the system described above including a separate access point wired to a host computer introduces a level of cost and complexity which is not required for the simple applications envisage with a very small number of mobile units.

One solution that has been proposed is to operate in a "ad-hoc" mode. This is an approved IEEE 802.11 mode of operation in which there is no AP. Instead one of the MU's takes on the burden of generating beacons to coordinate the hopping sequence among the various MU's. The major disadvantage to this approach is that support for a power saving mode (PSP) is not present; instead the system requires that all MU's are operating in CAM. Such an arrangement is not always desirable for hand-held terminals.

SUMMARY OF THE INVENTION

Objects of the Invention

It is an object of the invention to provide a communication system suitable for lower level communication requirements.

It is a further object of the present invention to provide a communication system including an access unit incorporated in a mobile unit.

It is yet a further object of the invention to provide a low level communication system offering the option of a power saving mode.

Features of the Invention

According to the invention there is provided a wireless communication system comprising at least a first and second mobile unit (MU), with the second mobile unit including the functionality of an access unit e.g., the capability of keeping track of which MUs are awake (CAM mode) and which are asleep (PSP mode). The second mobile unit preferably includes a first data storage area comprising an association table for storing information concerning other mobile units in the system and a second data storage area for a message transmission queue. The second mobile unit thereby has the capability to deal with a plurality of MU's both in CAM and PSP mode.

Preferred embodiments of the invention may include one or more of the following features.

The wireless communication preferably comprises spread spectrum communication (e.g., frequency hop).

The MU may include a radio card, and the access unit capability is maintained on the radio card. The system may be arranged to operate to the IEEE 802.11 standard protocol specification.

The association table may contain a predetermined number of entries, each for an individual MU. Each entry may contain at least the following fields:

an entry in use flag;

a power management mode flag;

a Power Save Polling (PSP) OK_to_Transmit flag;

the IEEE address of the MU;

the PSP station number assigned to the MU;

time of last interaction with the MU; and a count of the number of consecutive transmit failures for the MU. As a result operation of the system with a plurality of MU's is facilitated. The access unit may be arranged to disassociate from an inactive MU following a predetermined time-out period or a predetermined number of consecutive transmit failures. Redundant MU's are not, therefore, maintained indefinitely.

A third data storage area may be included for an access control list containing the IEEE addresses of MU's allowed to associate with the access unit. Accordingly, MU's not listed will be ignored, for example MU's from other systems.

The second storage area may include a transmit buffer queue for each MU operating in PSP mode.

The second data storage area may include a transmit queue for messages directed to MU's operating in continuously awake mode CAM.

The radio card may include standard access point, mobile unit, RF sniffer and embedded access point capability and is settable to any one of those capabilities. Accordingly, all capabilities may be included on a single card, reducing manufacturing cost and complexity.

According to the invention there is provided a radio card for a mobile unit in a wireless communication system, the radio card including embedded access point capability and having a first data storage area for an association table for storing information concerning other mobile units in the network and a second storage area including message transmit queue storage capability.

According to the invention there is further provided a mobile unit for a wireless communications network including an adapter card having embedded access point capability and having a first data storage area for an association table for storing information concerning other mobile units in the network and a second storage area including message transmit queue storage capability.

According to the invention there is further provided a vehicle based distribution system including a wireless communications system comprising a first mobile unit and a second mobile unit, the first mobile unit having embedded access point capability.

According to the invention there is further provided a retail store inventorying system including a wireless communications system comprising a first and second mobile unit, the first mobile unit having embedded access point capability.

According to the invention there is further provided a method of operation of a wireless communication network comprising a first mobile unit and a second mobile unit, the first mobile unit having embedded access point capability, wherein the first mobile unit embedded access point stores address and status information concerning all other mobile units in a network in an association table, and stores messages for transmission in a message transmit queue.

The association table may store mobile unit association information and the embedded access point allows association with a mobile unit dependent on predetermined criteria and enters the mobile unit association information into the association table.

The embedded access point may disassociate from a mobile unit if a time-out period is exceeded or if a predetermined number of successive transmit failures is exceeded.

The communications network may conform to the IEEE 802.11 protocol specification, all mobile units may transmit probe packets and the embedded access point may transmit a probe response packet, transmission of the probe response packet being initiated at the interrupt level. Acknowledgement messages sent by the embedded access point, and the first fragment of a packet following a poll request from a mobile unit may be initiated at the interrupt level. As a result the MU's cannot differentiate the embedded AP from a standard AP.

According to the invention there is yet further provided a wireless communication system comprising a backbone, a plurality of access points and at least one mobile unit wherein the access points communicate with the backbone and when the mobile unit roams from a first access point to a second access point, the first access point is only notified of the roam once the mobile unit issues a packet to the backbone. As a result the number of association/disassociation messages traversing the system is decreased, freeing processing time for other tasks.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 5 is an association table array according to the present invention; and

DETAILED DESCRIPTION OF THE PREFERRED EMBODIMENT

Figure 1:
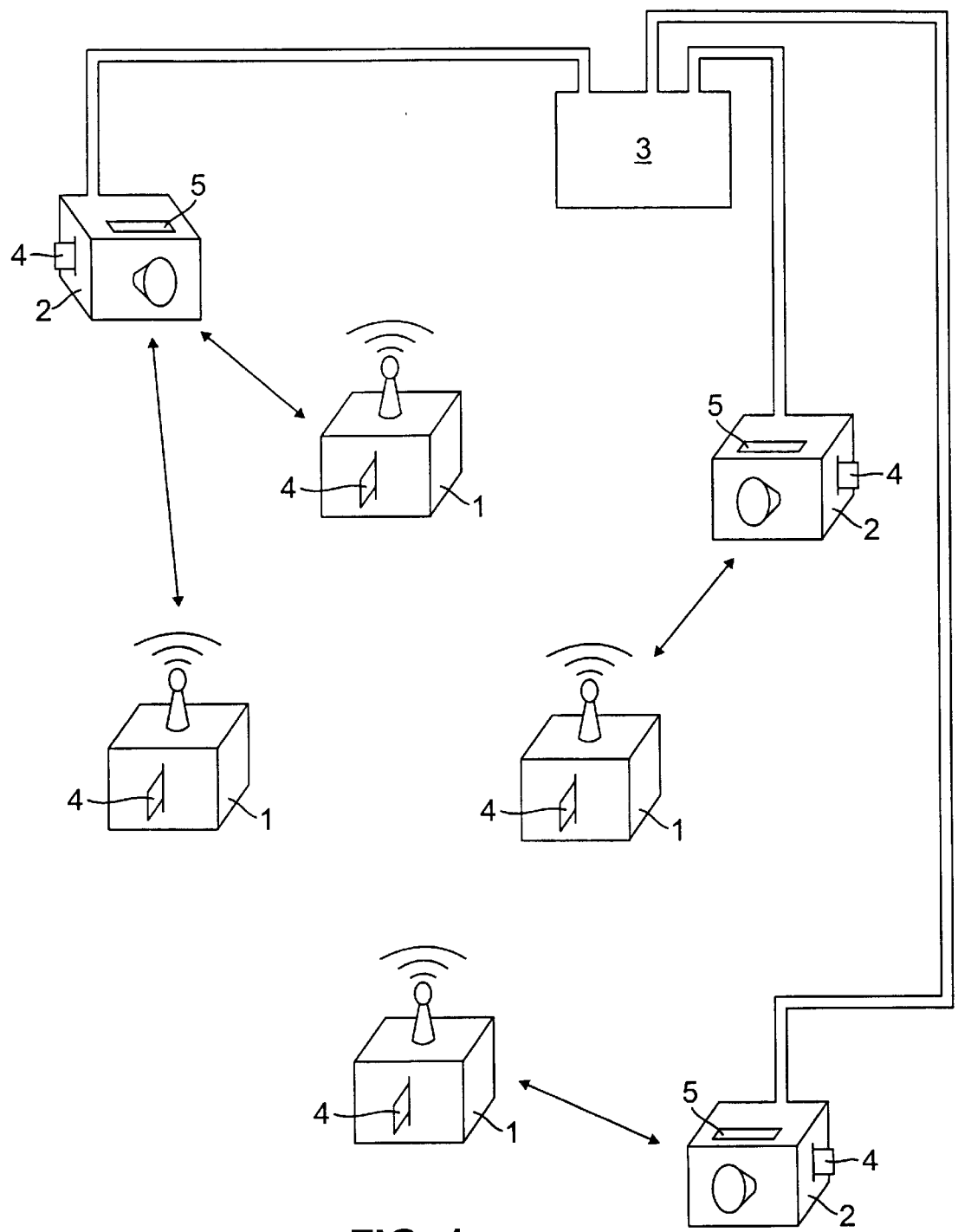
FIG. 1 shows schematically a known wireless communication network.

A system currently available is that offered by Symbol Technologies, Inc. based on the standard Spectrum 24 (™) Ethernet access point. The system is shown schematically in FIG. 1. The system includes a plurality of MU's 1 communicating with a plurality of AP's 2. The MU's 1 and AP's 2 communicate via wireless communication, for example radio frequency communication. The AP's are wired to a host computer 3, for example an Ethernet backbone. The wireless communication for both the AP and MU's is performed by a suitable adapter card, for example the Spectrum 24 (™) adapter card 4. The AP communicates with the wired Ethernet backbone 3 forming a bridging function between the wired and wireless sides. The AP has a serial port 5 to allow monitoring of network operation. Although in the following discussion systems using the "frequency hopping" method of wireless communication are described, it will be appreciated that various other forms of spread spectrum communication can be used (e.g., direct sequence methods).

For low level systems where the conventional system is at a level of complexity that is unnecessarily high, the present invention provides an embedded access point (EAP) as a low cost alternative to standard access points. In one implementation the EAP comprises an adapter card 4 in which the firmware has been modified to emulate an AP, or to be exact, the wireless side of a standard AP. Although the Ethernet and serial port capabilities of a true AP are lost together with the standard AP's large CPU and memory, the EAP is suitable for applications requiring a limited number of MU's (the current limit being 16) and where the traffic is relatively light. In practice, the limiting factor is the airwave bandwidth.

Figure 2:
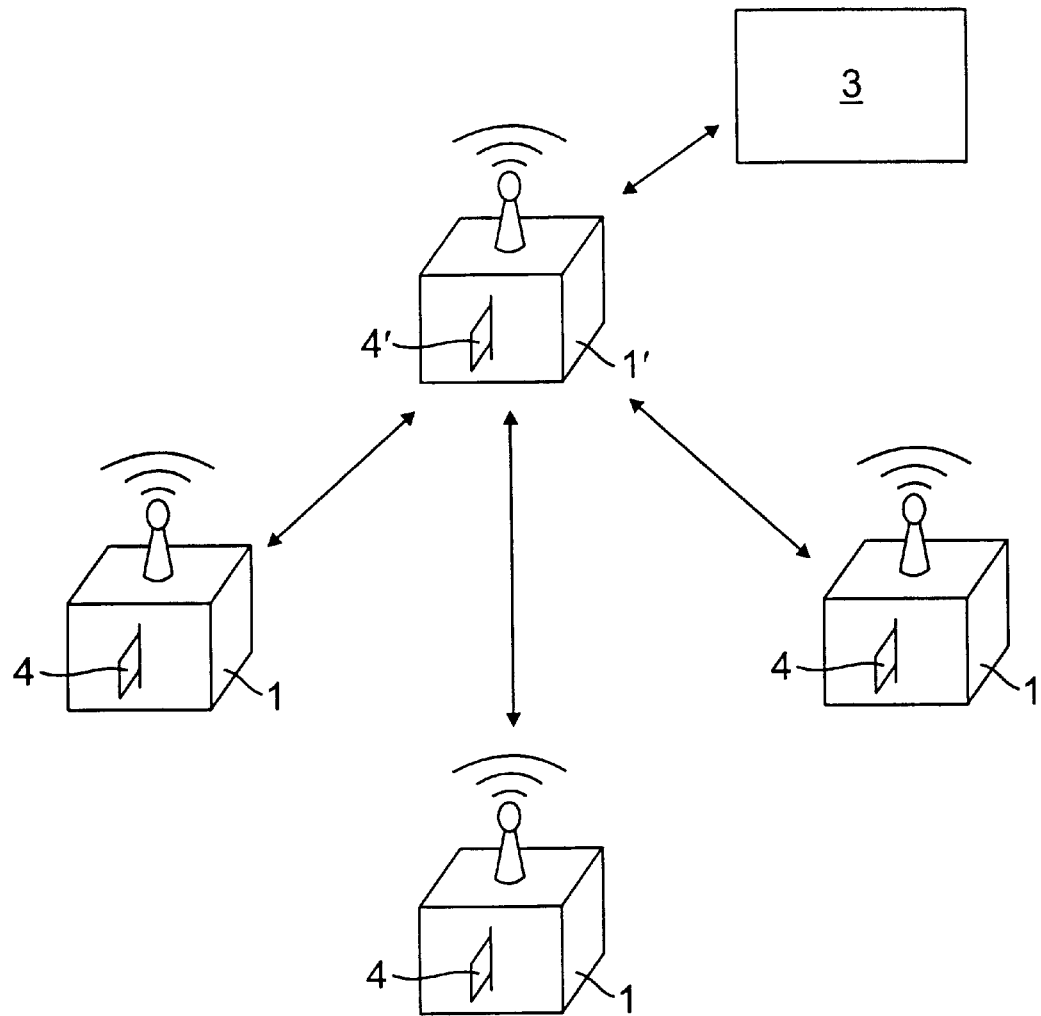
FIG. 2 shows a communication network according to the present invention.

As shown in FIG. 2 in its basic implementation the EAP can be achieved by modifying the software in drivers in an adapter card 4' such as a PCMCIA card so that they function together as an AP. The EAP is then coupled with an MU 1' such as a PC via a PMCIA slot. The PC 1' assumes responsibility for the bridging function to an external host 3 if one is required or can act as a host (fulfilling the function of the backbone computer) or server (storing all relevant information for later downloading). The PCMCIA card 4' comprises a modified radio card which serves as the interface to the radio frequency network for the system. The approach can be viewed as combining AP and MU functions into one unit 1'. The MU including the adapter card 4' has an interface to the RF network (via the driver such as an NDIS or ODI driver) and at the same time acts as an AP for a few (up to five) other units 1. It is assumed that the PC 1' holding the EAP would be externally powered so as to remain continuously operational, and as discussed in more detail below, the EAP would support PSP MU's.

Figure 3:
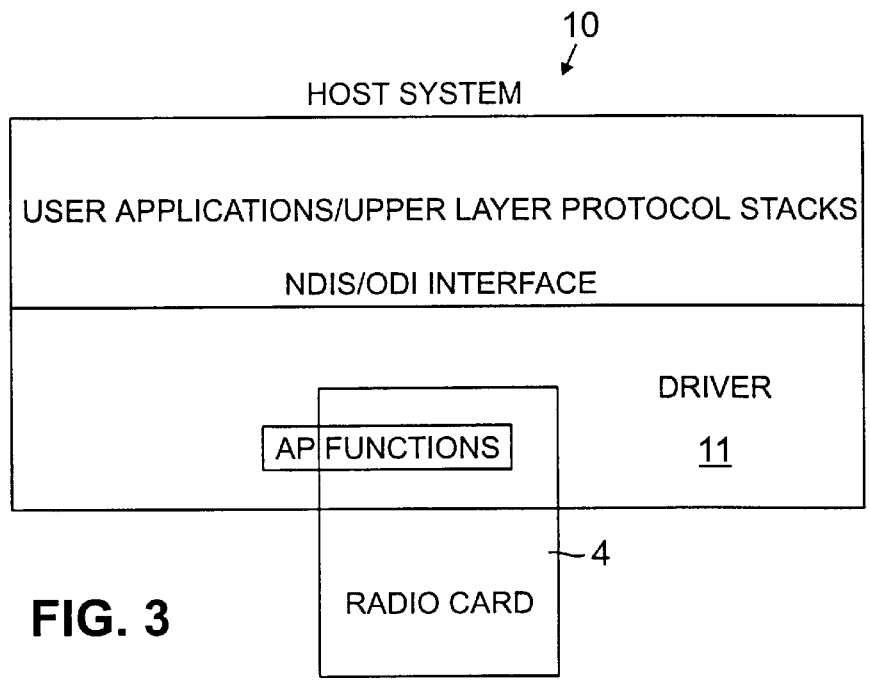
FIG. 3 shows the software for an adapter card according to the present invention.

A diagram showing the system of the invention is found at FIG. 3. As discussed above, the basic idea is that of adding a suitable software to the PCMCIA card 4 and its associated drivers so that it can act as an AP in addition to providing RF services to its host machine 10.

The AP functions can be split between the driver 11 and the adapter card 4, which could be a radio card such as that sold under the name Sirrius (™) Card. Certain functions such as beacon generation, acknowledgement messages and probes will be handled by the card 4 because of timing consideration. Others can be part of the driver 11 and there would also be capacity for configuration purposes. Alternatively, in the preferred arrangement, all of the AP functions are carried out by the radio card, the host playing no role.

Applications handled within the system would use the NDIS/ODI driver as in the present cases, and would not require any change. Various changes to the present adapter card/driver would be required of course which are discussed in more detail below, in particular because the card would have to respond to associate requests, and must generate beacons to coordinate hopping sequences and handle probes as well as other features discussed below.

Frames transmitted by the host 10 will go out as in conventional systems. Frames received, however, will be forwarded to the driver 11 where they will be either transferred to the host 10 (in messages destined for the host as MU or AP) or returned to the card 4 to be forwarded to another MU (for messages destined for another MU). Since only a few MU's are associated with the system, the look-up process is fast and easy for determining where the message or packet should be forwarded; from the association process the system knows the addresses of all the associated MU's and the address of the host (for example under the MAC protocol) is known to the host from its initial configuration. As there is no Ethernet connection the demands on the CPU are minimal; any fragmentation or reassembly of packets can be handled by the driver 11 and PSP will be handled by the card 4. Once again as only a few MU's are present, all data structures are static and simple to operate upon. These basic concepts will be expanded below.

The system includes the capability of configuring the MU/AP to include various EAP specific parameters such as network ID (ESS). The card can be reconfigured at any time to operate as a pure MU by disabling its AP capabilities which would involve a restart of the driver 11 and reset of the card 4.

Two applications for the EAP are discussed here; one on delivery trucks in the distribution industry and one in small retail stores. In addition, there are possible generic local (small) network applications.

For the delivery truck application, the EAP will support wireless communication with an MU carried by the user. The EAP's PC will support satellite communication with the distribution hub that is, the control or host system. The user, therefore, may communicate with the hub while inside or outside the truck, or use the PC on the truck as a server to buffer data. Likewise, data from the hub sent to the MU may be buffered within the PC if the driver/MU is temporarily out of range of the EAP. Finally, communication between the EAP and/or MU and a standard AP is required when the truck returns to the distribution hub. This application requires the EAP to support only one MU with low volume traffic. To conserve the MU's battery power, the EAP allows the MU to operate in PSP) mode.

The second application involves the EAP controlling an AP cell in a small retail store. The MU's may be terminals with scanners or WPOS's. The PC acts as a server and runs application programs. For this application, the EAP must support up to a predetermined number of MU's, allow MU to MU communication and support Continuously Awake Mode (CAM) for the WPOS's.

Additionally, the EAP can be used to create a low cost PC network for applications such as Windows for Workgroups, NetBIOS and TCP/IP (Trade Marks). This configuration should not be confused with an 802.11 "ad-hoc" network, but it would provide similar functionality, except that the EAP supports PSP while ad-hoc does not.

The system can be based to a large extent on the current IEEE 802.11 standard which follows the traditional office model comprising an infrastructure and various systems attached to the infrastructure, similar to a wired Ethernet. In the cases discussed above, a full scale system including an AP, AP/host wiring, a plurality of MU's and so forth becomes expensive and overly complex and there are many RF installations in which the parallel port model is better. In in-truck systems an RF link connects a truck resident PC and a portable terminal MU. As with convenience stores, the problems of such a system are evident and discussed above. In particular it is reiterated that the ad-hoc mode might be considered if it were able to include the capability of operating in PSP which is the most likely mode of operation for portable MU's.

The cost of an EAP would in fact be no more than the cost of the radio card which would be considerably less than the cost of the various components of a full system.

The system is designed so as to be able to support a predetermined number of MU's in such a way that the MU's are unaware that they are not associated with a standard AP. Accordingly the EAP must conform to the relevant parts of whatever protocol is adopted by the system, for example the IEEE 802.11 specification. In this case compatibility is required of the MAC and PHY layers defining elements such as message formats and the "transmit back-off algorithm". In addition the EAP will use the PHY layer in the same manner as a standard AP so that the same method is used for clear channel assessment (CCA) and the same duration being adopted for the "interframe gap" (IFG) between a received frame and a transmitted acknowledge.

Figure 4:
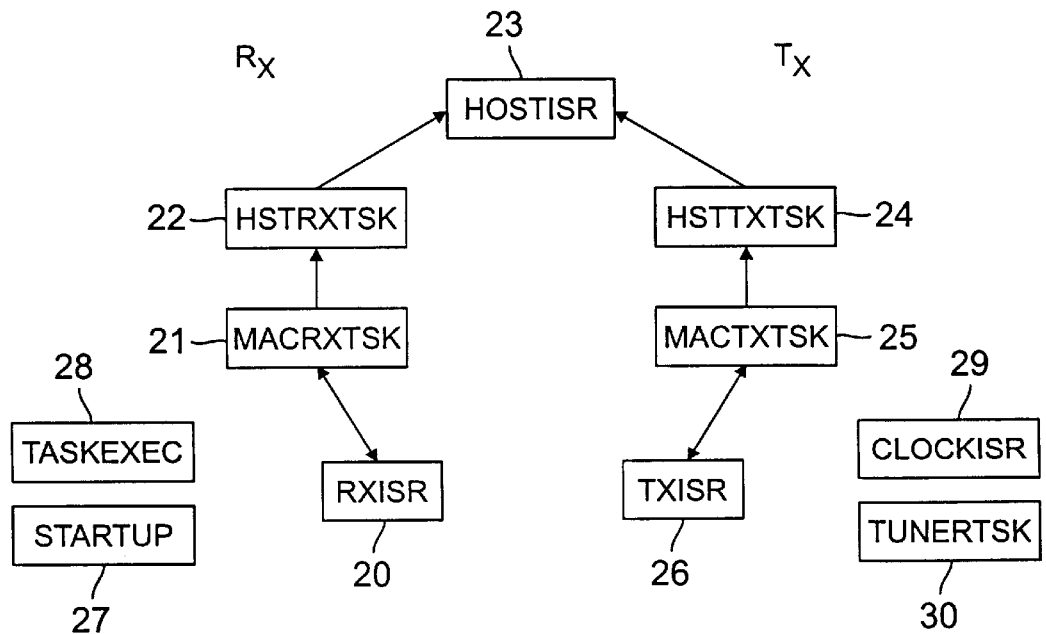
FIG. 4 displays firmware architecture common to know MU's and an embodiment of the present invention.

It will be appreciated that, in order to allow conformation to exist in protocols, the EAP will share many of the same functional features as existing MU's. Accordingly the EAP firmware and MU firmware will share the same basic architecture, and in many cases will use identical software procedures. FIG. 4 is a block diagram which illustrates the architecture shared by the EAP and MU firmware. The IEEE 802.11 specification is adopted in the following discussion.

The architecture consists of two main data flow paths; one for receiving data (Rx) and one for data transmission (Tx). Data is first received, and the MAC header fields verified, by the Receive Interrupt Service Routine (Rx_ISR 20). Qualified MAC frames are passed to MAC_Rx_Task 21 where they are further filtered based on destination address. Accepted MAC frames are passed to Host_Tx_Task 22 where they are re-assembled (if necessary) into host/Ethernet packets. When re-assembly of a packet is computer, the Host Interrupt Service Routine (Host_ISR) 23 coordinates handing of the packet to the driver.

Data transmission proceeds in the reverse direction, in terms of the firmware hierarchy. A host packet (already fragmented into MAC frames by the driver) is received by Host_ISR 23 and passed to Host_Tx_Task 24 where it is qualified based on destination address and stored into the appropriate MAC layer Tx queue. The MAC_Tx_Task 25 services the various MAC layer queues, initiating one Tx at a time based on priority. A transmit task completes when a ACK is received by the Tx interrupt service routine, TX_ISR 26 (actually the is DMA_ISR). Transmit status flows in the opposite direction back to the host.

Other firmware functions, which are not directly involved in the basic Rx/Tx capability, include:

a) Startup 27—responsible for firmware initialisation b) Task_Exec 28—a simple executive which controls task switching c) Clock_ISR 29—services the clock rollover event d) Tuner_Task 30—controls frequency hopping.

It will be seen therefore that various features of operation are common to both the MU and EAP firmware. As a basic rule when requirements are identical existing procedures will be used by both the MU and EAP firmware. The functions in the Clock ISR unit 29 (clock interrupt service routine) will be found in this class; transmission back-off, transmission re-tries and CCA will also be carried out commonly.

As much of the firmware is common, a common firmware load is burned into adapter memory during manufacture. After an adapter is reset, the driver directs the firmware to configure itself to function as either standard AP firmware, MU firmware, RF sniffer firmware or EAP firmware. The utility which loads the firmware during manufacture (S_MFG) needs to accept an additional parameter which specifies that an adapter card is an EAP. This indication is burned into flash memory along with other configuration information; for example, the adapter's unique IEEE address. The absence of the EAP configuration flag in a standard adapter card of known type will inhibit it from configuring itself as an EAP. This approach allows a single generic adapter card usable within all products; it will be seen that in a delivery track application there is the possibility of reconfiguring an EAP (via an adapter rest) into an MU adapter in order to allow it to communicate with a standard AP distribution hub.

In effect, the variable Embedded_AP will be set to True or False during adapter initialization depending on whether the adapter is being configured as an EAP. When the EAP functionality differs only slightly from an existing MU firmware procedure, conditional code will be inserted so that both may use the procedure. Host_Rx_Task may fall into this group.

New procedures will be created for the EAP in cases where functionality differs significantly from the MU firmware or where dictated by timing considerations. The Receive Interrupt Service Routine (Rx_ISR) 20 and the MAC Layer Transmit task (MAC_Tx_Task) 25 will need to have different versions for MU and EAP firmware.

As discussed above the two main differences between the MU and EAP firmware are in the areas of association and power save polling (PSP) mode. The EAP must process MU association requests and maintain a history of MU associations. For PSP mode the EAP must maintain individual transmit codes for each PSP utilizing unit, generate traffic indicator maps (TIM), fields within beacon frames and respond to poll requests.

The modified system will now be discussed in more detail.

A packet sent out by a mobile unit will be one of various possibilities. For example it may be a probe packet or an associate request both of which are discussed above. Alternatively it may be addressed to the EAP acting as an access point or to another mobile unit in which case the message must be transferred via the EAP. Alternatively the message may be a broadcast/multicast message to be transmitted to all available MU's.

As discussed above, the EAP will communicate with MU's as defined in the IEEE 802.11 specification in the embodiment discussed herein and will support the MU's in such a way that they are unaware that they are not associated with a standard AP. The EAP includes an association table indicating which MU's are currently associated with it and which is discussed in more detail below. For sixteen MU's, therefore, the table will contain sixteen entries.

The EAP will response to an MU probe packet which is broadcast on its domain (Net_ID) by sending a probe response packet to the MU. The interframe gap (IFG) between the probe and probe response shall be less than or equal to the IFG created by a standard AP's response.

The EAP shall send a MAC-level ACK receiving an Associate frame from an MU. If the association criteria is satisfied, the EAP shall transmit an Associate Response frame within 6 milliseconds. As is the case with the standard AP, an ACK following a probe response will be accepted but is not required in order for the association to be considered successful. An Associate Response will always be sent to an MU which is already represented in the Association Table. Obviously, the creation of a new Association Table entry is not required in this case. If all Association Table entries are in use, an association request will be denied; that is, an Associate Response will not be sent.

After a probe has been accepted, the transmission of a probe response is initiated by Rx_ISR 20. The Tx is initiated at the interrupt level so that the interframe gap (IFG) between a probe and its response is not greater than the IFG created by the standard AP. The probe response frame resides in a dedicated Tx buffer. For speed, constants within the frame are set during adapter initialization. The Tx is performed by calling the Transmit_Frame utility and requesting that it wait for and process an ACK. The ACK is not really required since probe responses are not retried. However, since the IEEE 802.11 protocol requires ACKs for all directed MAC frames, the ACK is processed in order to allow a clean transition to the medium clear state.

As mentioned above, the EAP includes an association table by virtue of which it is distinguished from the MU, allowing association together with a PSP mode.

The Association Table is a structured array containing in the exemplary embodiment five entries, allowing five MU's to be associated with an EAP at any one time. Each entry is linked onto one of two queues; an in-use queue or an available queue.

As shown in FIG. 5 an Association Table entry contains the following fields:

1) A link pointer 40.
2) A status field 41 containing:
   a) an entry In_Use flag 41*a* (available for use by ASTATI, an adapter monitoring utility)
   b) a power mode flag 41*b* (CAM or PSP)
   c) a flag 41*c* indicating that it is OK to transmit the remaining fragments of the current packet on the MU's PSP queue, set after a poll frame has been received and the first fragment has been sent, further discussion of which is found below.
3) The IEEE address 42 of the MU.
4) A pointer 43 to the first transmit buffer in the MU's PSP queue. A zero pointer indicates an empty queue.
5) The PSP station number 44 assigned to the MU. This field is set once during adapter initialization. The five Association Table entries are permanently assigned PSP station numbers 1 through 5, respectively.
6) A transmit status indication 45. Used to pass the results of a TX attempt to a PSP station to MAC_Tx_Task.
7) The time 46 of the last interaction with the MU. An interaction includes a received frame from the MU (including Probes) or an ACK received following a frame sent to it. The field is used to disassociate from an inactive MU following a time-out period.
8) A count 47 of the number of consecutive Tx failures for the MU. The field is used to disassociate from an MU following N consecutive failures.

An EAP shall only transmit packets to MU's that are currently associated with it. A request from the host to transmit to a destination address 42 which is not present in the Association Table will be rejected.

An EAP only receives directed packets which are addressed to it or to an MU present in the Association table. Packets addressed to the AP will be passed to the host 10 via the driver interface. Packets addressed to MU's are re-transmitted.

Broadcast packets are always transmitted, regardless of whether the request came from the host or was a packet received from an MU. Broadcast packets received from an MU are also passed to the host 10.

The EAP further includes an Access Control List which contains the IEEE addresses of MU's which are allowed to associate with the given EAP. Two new driver extension commands will allow an application to add or delete entries in the Access Control List. If the list contains no entries (the default case), an EAP will not filter MU associations based on IEEE address. Otherwise, an MU's IEEE address must be in the Access Control List in order for an association request to be accepted.

This capability can be used in the retail store application to prevent association of MU's from nearby stores. In the delivery truck application, it can be used to prevent MU's from roaming to other trucks when trucks are in close proximity at the distribution hub. The use of the "Mandatory AP" feature by the MU's is an alternate way to tie an MU to a given truck.

An MU requests association with an AP by sending an Associate frame. The frame is received and ACK-ed by Rx_ISR 20 and then passed to the task level (MAC_Rx_Task) 21 for processing.

The Association Table is searched to determine if the MU is already associated with the EAP. If so, the association request is accepted and an Association Response will be transmitted as described below. If the MU is switching its power management mode (from CAM to PSP or from PSP to CAM), any queued Tx buffers for the MU are moved between the MU's PSP Tx queue and the CAM Tx queue, as appropriate, and as discussed below.

If the EAP is not already associated with the MU, an association request is accepted if the following criteria are met:

a) There is an unused Association Table entry.
b) The MU's IEEE address is in the Access Control List or the list is empty (implying that qualification via the Access Control List is not is use).
c) The dedicated Associate Response buffer does not already contain a pending Associate Response Tx request.

An Association Table entry is created for the MU following acceptance of an association request (if it was not already represented in the table). An entry is delinked from the available entry queue and linked onto the Association Table in-use queue. Finally, the Associate Response frame is constructed within its dedicated buffer and the Associate Response pending indicator is set. The frame will be transmitted by MAC_Tx_Task 25 as described below.

At this point, the MU is associated with the EAP, per the current design of the standard AP. A successful association is not contingent upon sending the Association Response frame or receiving its ACK.

The EAP will disassociate from an MU (per the design of the standard AP) if no activity is detected from the MU for a period of T minutes 47 or if attempts to send it data result in N consecutive Tx failures 48. Activity is defined to be a message received from the MU or an ACK for a message sent to the MU. Disassociation involves discarding all Tx buffers queued for the given MU and returning its Association Table entry to the available entry queue. Discarded Tx buffers are treated like "Tx failures", with the appropriate status being returned to the host.

The EAP accordingly supports the current disassociation design. If the EAP receives a Probe frame from an MU which is in its Association Table and the "AP_ID" within the Probe indicates the MU is no longer associated with it, the association with the MU is dropped and the corresponding Association Table entry is cleared. Also the EAP indicates in each Probe Response whether it is associated with the given MU.

The EAP supports both Continuously Awake Mode (CAM) and Power Save Polling (PSP) mode. Each MU independently selects its power management mode at the time of association.

The EAP maintains a transmit buffer queue for each MU operating in PSP mode. Additionally, there is a transmit queue for messages directed to CAM stations and a queue for broadcast messages. There is a minimum of 21 maximum-sized MAC transmit buffers allowing the queuing of 7 maximum-sized Ethernet packets. (A maximum-sized Ethernet packet is fragmented into three MAC buffers.) The Traffic Indicator Map (TIM) and DTIM fields within beacon frames shall be set, per the protocol specification, in order to inform PSP stations that the EAP has data queued for them.

The capability of the EAP to support Power Saving Polling (PSP) mode requires the most significant modifications to the underlying MU firmware structure. A MAC layer transmit queue is required for each PSP station rather than the one queue used by the MU firmware. And, since responses to Polls are required to start approximately as fast as ACK's, data transmissions will be initiated within the Receive Interrupt Service Routine; thereby creating a complex "control flow" not required in the MU firmware. These topics are addressed below.

There will be a dedicated PSP Tx (transmit) queue in the EAP for each associated MU which is in PSP mode. Packets destined for a PSP station will be queued until the station requests data via a Poll. A pointer within each Association Table entry will point to the first Tx buffer in the PSP queue. In addition to PSP Tx queues, there will be one Tx queue for MU's which are in CAM mode and one queue for broadcast/multicast packets. The broadcast queue is needed to support the delivery of broadcast packets in PSP mode as described below.

Note that it is complete host-Ethernet packets which are placed on Tx queues, never individual MAC frames. (Host/Ethernet packets may be up to 1500 bytes in length and ma need to be fragmented into three MAC frames containing approximately 500 bytes each.) The result is that Tx queues always contain fragments in the proper sequence and fragments from different packets are never interleaved. This packet vs. frame approach is required since PSP stations Poll for packets. Following a Poll, a station will remain "awake" until all fragments for the given packet are received. A subsequent Poll is sent only if the "More" flag indicates that another packet is queued.

TIMS and DTIMS are fields within beacon frames, as defined in the IEEE 802.11 Specification. TIMS identify PSP stations for which there are queued Tx buffers. DTIMS control the delivery of broadcast messages to PSP stations. The EAP will transmit TIMS and DTIMS as for standard APS. For example, a beacon with a DTIM counter less than the maximum value (7 Fh) will be generated only if there are frames in the broadcast queue. This results in PSP stations only awakening for beacons with DTIM counters equal to zero when there is actually broadcast data to be sent.

A Poll frame is sent to the EAP by a PSP stations after a TIM has indicated that the EAP has data queued for it. Poll frames are received by Rx_ISR 20 and qualified based on MAC header fields. After a Poll frame is accepted, Rx_ISR 20 will initiate the Tx of the first fragment of the packet which is first on the MU's PSP Tx queue. The Tx is initiated at the interrupt level in order to satisfy interframe gap timing requirements between a Poll and its Poll response. After the Tx is started, Rx_ISR 20 "returns", allowing processing to continue at the task level while the Tx is in progress.

A Poll response is a directed frame requiring an ACK. The Tx processing of all directed frames is completed by DMA_ISR. This interrupt service routine is entered when the last byte of a frame has been DMA-ed into the radio controller's Tx FIFO. DMA_ISR monitors the completion of the Tx and then receives and qualifies the ACK. If a Tx to a PSP station fails, the Tx status is passed to MAC_Tx_Task 25 for post-processing and retry at the task level. The Tx status is stored into the MU's Association Table entry. This allows Rx_ISR 20 to send Poll responses to several PSP stations without requiring intervening post-processing by MAC_Tx_Task 25. If a Tx to a PSP station is successful, DMA_ISR will advance to the next buffer in the MU's PSP queue. The OK_to_Transmit flag 41c is set if the frame is another fragment for the current packet. Otherwise, the OK_to_Transmit 41c flag is cleared. Processing successful Tx-s to PSP stations at the interrupt level allows a subsequent Poll for the next packet to be received without intervening in processing at the task level by MAC_Tx_Task 29.

MAC_Tx_Task 29 will initiate a transmit of the first buffer in a PSP queue if its OK_to_Transmit 41c flag is set. The Tx may be the first transmission attempt for the second or third fragment of the current packet, or a Tx retry following any unsuccessful PSP Tx attempt. (MAC_Tx_Task 25 chooses among many pending Tx-s per the priorities defined below).

Note that the standard AP sends all fragments for a packet without intervening Tx backoffs or CCA checks, unless a hop occurs during the sequence. This results in short interframe gaps. The current MU firmware design, on the other hand, does backoff before each fragment. The unit of transmission for the MU firmware is the MAC frame, not the Ethernet packet. The 802.11 protocol allows packet transmission per the standard AP design but does not require it. The EAP is based on the MU firmware and therefore will backoff before each fragment.

Poll frames for a given MU will be rejected by Rx_ISR 20 if the OK_to_Transmit flag in the MU's Association Table entry is set. This addresses the case where a Poll was previously received by Rx_ISR 20 but the subsequent Poll response was unsuccessful. The Poll response retry is the responsibility of MAC_Tx_Task 25. The MU will cease its Poll Tx retries when it eventually receives the Poll response (as in current MU firmware design).

The manner in which the system processes frames and packets will now be discussed in more detail.

Rx_ISR 20 is responsible for receiving all MAC frames. In order to be accepted, frames must pas the following MAC header tests:

a) The TYPE field must indicate "Uniframe".
  b) The Control field must have the To_AP flag set and the From_AP flag clear.
  c) The NetID field must match the NetID (ESS and BSS IDs) of the given EAP, except Probe frames which use a broadcast BSS.
  d) The Channel field must match the channel of the current hop.

In addition, if the frame is not a Probe or an Associate, the source address within the MAC header must match the IEEE address of one of the MU's in the Association Table. If the above tests are successful and a "CRC good" indication is received at the end of the frame, an ACK will be transmitted. Note that broadcast frames are also ACK-ed as with current systems.

The EAP Rx_ISR 20 maintains the MU firmware design for long frames. After a long frame has passed its acceptance test, the Rx interrupt service routine "returns", allowing control to return to the task level. Control is returned to the interrupt level, via a CPU timer interrupt, shortly before the end of the frame in order to complete the processing. The Rx_In_Progress variable is set to TRUE during this time in order to inhibit hopping or the start of a transmit.

Successful Probe and Poll frames result in the initiation of a transmit by Rx_ISR 20 in order to satisfy interframe gap timing requirements.

Successfully received frames, other than Probes and Polls, are placed on a queue for MAC_Rx_Task 25 for further processing at the task level.

The MAC_Rx_Task 25 filters MAC frames based on the IEEE destination address within the frame's MAC header. Rx_ISR 20 has already filtered the frames based on source address, accepting frames only from associated MU's. All broadcast/multicast frames are accepted. Directed frames are accepted only if they are addressed to the EAP (i.e host_ or to one of the MU' s in the Association Table. The Rx buffers for rejected frames are returned to the available Rx buffer queue.

Associate frames are processed to determine if the association request will be accepted. If successful, a request to transmit an Associate Response is passed to MAC_Tx_Task 25. In either event, the Association frame buffer is returned to the available Rx buffer queue.

WNMP Ping or Echo messages, which are directed to the EAP, result in the creation of a Ping response or Echo response frame. The response frame is stored into the CAM Tx queue or a PSP Tx queue depending on the power mode of the MU which sent the request. The Rx buffer containing the Ping or Echo message is returned to the available Rx buffer queue.

Frames which pass the filtering tests, other than Associate frames and WNMP messages, are placed on a queue for Host_Rx_Task 22.

Frames which have passed acceptance tests (for the host or an associated MU) are passed to Host_Rx_Task 22 for re-assembly, including the trivial one fragment case. There is the capability to reassemble up to give Ethernet packets concurrently, one from each of the five possible MU's. Reassembly errors are handled per the current MU design (duplicates, orphans, ageout, etc).

When a packet is successfully reassembled, it is disposed of in one of four ways:
a) If addressed to the EAP, it will be passed to the host/driver 10/11 per the existing MU firmware design.
b) If it is addressed to an MU which is in CAM mode, the fragments will be placed at the end of the CAM Tx queue.
c) If it is addressed to an MU which is in PSP mode, the fragments will be placed at the end of the PSP Tx queue for the specified MU.
d) If it is a broadcast/multicast message, it will be passed to the host and, if there are other associated MU's, it will also be placed on the broadcast queue for subsequent re-transmission.

For an MU to MU relay, the To_AP flag in the MAC header Control byte is cleared and the From_AP flag is set.

Note that an MU's association is re-verified (with interrupts disabled) before attempting to queue Tx data for it. This is necessary to protect against the case where an MU is disassociated while a packet reassembly is in progress.

Host_Tx_Task 24 receives a host packet to transmit after a driver for example an ODI or NDIS driver has copied the data into adapter memory and informed Host_ISR 23 of the transit request via an interrupt. Note that packet fragmentation is performed by the driver and that Host_Tx_Task 24 always receives all packet fragments as part of one transmit request.

Host_Tx_Task 24 processes a packet transmit as follows:
a) The fragments for a broadcast/multicast packet are placed at the end of the broadcast queue.
b) Directed packets are rejected if their destination address does not match one of the IEEE addresses 42 in the Association Table. Otherwise, the fragments that make up the packet are placed at the end of the CAM Tx queue or a PSP Tx queue depending on the power mode of the MU.

In order to support fast Poll responses (by Rx_ISR 20) and fast Tx starts in general (by MAC_Tx_Task 25), MAC headers are initialized prior to placing buffers on the Tx queues. In addition, the initial Tx backoff slot count and total Tx time are computed and saved within the Tx buffer Workspace. (The total Tx time is used to determine if there is sufficient time to complete a Tx prior to the next frequency hop.) Of necessity, the hoptick and channel fields must be filled-in just prior to starting the Tx.

When adding a packet to a PSP queue which is not empty, the "More" flag will be set in the MAC header of the buffer which was previously at the end of the queue.

The MAC layer transmit task is responsible for all EAP transmissions except:
a) ACK's, which are sent by Rx_ISR 20 utilizing the Crux automatic Rx-to-Tx capability in order to satisfy the 802.11 timing requirement.
b) Probe Response frames which are sent by Rx_ISR in order to accommodate fast scanning by MU's.
c) The first fragment of a packet following a Poll request, which is initiated by Rx_ISR in order to satisfy the 802.11 timing requirement.

The MAC layer transmission function is a task level function (MAC_Tx_Task 25) which suspends until the MAC_Tx event has been signalled (to the System Executive) or until a beacon transmit time has been reached. The MAC_Tx event is signalled when:
a) A Tx initiated by MAC_Tx_Task 25 has completed. The Tx attempt may or may not have been successful.
b) The OK_to_Transmit 41c flag has been set for a PSP Tx queue by DMA_ISR, either because the Tx of a fragment to the PSP station was unsuccessful or because there are additional fragments to be transmitted for the current packet. (Note: Successful transmits to PSP stations are processed at the interrupt level of DMA_ISR).
c) A host packet has been placed on the CAM or broadcast queue by Host_Tx_Task 24.
d) A packet received from an MU has been placed on the CAM or broadcast queue by Host_Rx_Task 22.
e) An associate response frame is ready to be sent. The event is signalled by MAC_Rx_Task 21.
f) An Rx_In_Progress, which had inhibited MAC_Tx_Task 25 from initiating a Tx, has completed.

Multiple tasks may be pending when MAC_Tx_Task 25 is dispatched. Some of the tasks involve post-processing following the completion of a Tx attempt; others involve initiating transmits. Tasks will be performed in priority order as defined below. When MAC_Tx_Task 25 first receives control, it will disable interrupts and search for its highest priority task. New tasks may have been added since its last dispatch. For example, a Tx retry at a given priority level may be delayed due to a higher priority Tx request. This approach allows beacons and associate responses to take precedence over other Tx activity.

The following are the tasks that MAC_Tx_Task 25 performs. The tasks are listed in decreasing priority order.

1) Post-processing following one or more Tx attempts:
   a) Associate Response. Three tries are allowed.
   b) Broadcast Tx queue. Broadcasts are not ACK-ed and need never be retried. Broadcast_Allowed is set to FALSE if the broadcast queue is empty.
   c) One or more of the PSP Tx queues. N tries are allowed. M tries per hop are allowed. The OK_to_Transmit flag 41c is cleared if there are no other fragments in the current packet. The TIM flag for the PSP station is cleared if the PSP queue is empty.
   d) CAM Tx queue. N tries are allowed. M tries per hop are allowed.

After a Tx is successful or has failed due to maximum tries, the Tx buffer is delinked from its MAC Tx queue and placed on an available buffer queue. Buffers that have the "Rx buffer" flag set are placed on the Rx available queue. These buffers are temporarily transferred from the Rx to Tx queues in order to complete an MU to MU transfer. Other buffers are placed on the Tx available queue.

2) Transit an Associate Response if a request is pending.
3) Transmit a beacon if a beacon timeout has occurred. If a beacon has a DTIM counter equal to zero, set Broadcast_Allowed to TRUE.
4) If Broadcast_Allowed is TRUE, transmit a frame on the broadcast/multicast queue.
5) If the OK_to_Transmit flag 41c is set, transmit the next fragment on a PSP Tx queue. All PSP queues are examined.
6) Transmit the next frame on the CAM Tx queue.

No transmits will begin until medium access has been obtained per the IEEE 802.11 Protocol Specification. MAC_Tx_Task 25 will suspend for the "Next_Hop" event if there is insufficient time to complete the selected Tx prior to the next frequency hop.

Due to the complexity of the MAC_Tx_Task 25, a Program Design Language (PDL) description of its logic is included in Appendix A.

Transmit_Frame is a utility which is responsible for initiating the transmit of all MAC frames. The only transmits not performed by Transmit_Frame are ACK's, which are sent via the Crux automatic Rx-Tx capability. Transmit_Frame will wait in-line for short transmits to complete if an ACK is not required (e.g. beacons). For long frames or frames requiring ACK's, Transmit_Frame suspends for the Tx_Complete event which will be signalled by DMA_ISR when the Tx is complete. The suspension allows other tasks to execute during the Tx.

For the EAP firmware, Transmit_Frame will be responsible for time critical functions which must be performed just prior to the start of a Tx. These include:
   a) Wait in a loop for the exact beacon transmit time when the frame to be transmitted is a beacon. Beacons must never be transmitted early to PSP stations.
   b) Calculate the hoptick value just before starting a Tx and store it into the MAC header field.
   c) Store the current channel number into the MAC header field.
   d) After starting the transmission of a beacon, calculate the value for the Time_To_Next_Beacon field and store it into the beacon frame.

The Tx processing of all directed frames is completed by DMA_ISR. The interrupt service routine is entered when the last byte of a frame has been DMA-ed into the radio controller's Tx FIFO. DMA_ISR monitors the completion of the Tx and then receives and qualifies the ACK.

The EAP capability requires DMA_ISR to process additional types of Tx:
   a) After processing the Tx of a Probe Response and its ACK, DMA_ISR will simply clear the Tx_In_Progress flag. No task nor notification is required.
   b) Processing after a Tx is sent to a PSP station depends on whether the Tx was successful. If not successful, the Tx status is stored into the MU's Association Table entry and the OK_to_Transmit flag 41c is set. If the Tx was successful, DMA_ISR removes the transmitted buffer from the PSP queue. The OK_to_Transmit flag 41c is set if there are additional fragments for the current packet. If OK_to_Transmit has been set, MAC_Tx_Task 25 is unblocked by setting the MAC_Tx event. Once again, the reason for processing successful PSP Tx-s at the interrupt level is to allow another Poll from the station before MAC_Tx_Task 25 has been dispatched.

In order to support the above, DMA_ISR will be given a data structure for each Tx which defines what kind of Tx it is (Probe Response, PSP Tx, normal) and a pointer to where the Tx status should be stored.

With regard to other features of the system:

Host_ISR supports the new driver extension commands required to configure an EAP; namely, Set AP_ID, set hop sequence, add Access Control List entry and delete Access Control List entry.

The EAP will not call the MU roaming function during a hop transition.

While in the idle loop (Task_Switch), the EAP will not call the MU PSP suspension function or the MU adapter Sleep function.

The EAP frequency hops with sufficient accuracy such that the MU's are unaware that they are not associated with a standard AP. The EAP sets the hoptick field in each frame it transmits so that the MU's can maintain hop alignment. The hoptick is accurate to within one count.

The EAP transmits beacon frames per the protocol specification. Beacons are never transmitted early and no more than 300 microseconds late unless delayed due to a carrier busy condition. The Time_To_Next_Beacon field within the beacon frame is accurate to within 100 microseconds.

In CAM mode, the EAP has a throughput capacity of at least 40 k bytes per second where capacity is defined to be the sum of payload bytes either transmitted or received. The EAP is able to transmit/receive at least 100 frames per second in CAM mode.

In PSP mode, the EAP has a throughput capacity not less than 90% of the capacity of a standard AP operating in a similar PSP environment.

The EAP maintains the same memory structure for statistics as the MU firmware. This will allow the basic transmit and receive statistics to be dynamically displayed by the ASTATI utility. Additional statistics, which are specific to the Access Point function, shall also be maintained and may optionally be displayed.

The EAP has a packet loopback mode for in-house testing. Packets received from an MU are sent back to the MU rather than being passed to the driver. The MU may operate in either CAM or PSP mode. The loopback mode is invoked via conditional assembly and has no effect when not selected.

Applications interface with the EAP in the same manner as applications interface with an MU adapter card. The application (or protocol stack) interfaces with the driver, for example the Spectrum 24 ODI or NDIS driver. The driver, in turn, interfaces with the EAP firmware across the PCM-CIA hardware interface. The driver/EAP firmware interface is the same as the driver/MU firmware interface. No driver modifications are required, except for support for additional driver extension commands namely select EAP firmware mode set Net_ID Set AP_ID set hop sequence add Access Control List entry delete Access Control List entry.

In the case of adapter initialization (Startup) if the Embedded_AP variable is TRUE, Startup initializes the EAP data structures, including the Association Table, the Tx queue control structures and the dedicated frame buffers for beacons, probe responses and associate responses. In addition RAM is segmented into 21 maximum-sized Rx buffers and 21 maximum-sized Tx buffers. The buffers in each class are linked together and placed on the available Rx and Tx queues. And finally, the interrupt vector for the receive interrupt service is set to point to the EAP version of Rx_ISR and the Task Control entry for MAC_Tx_Task 25 is initialized to point to the EAP version of the task.

It can be seen, therefore, that the present invention allows the provision of an embedded access point (EAP) which is particularly suitable for low level systems involving, for example, five or less mobile units in which a full, dedicated access point would introduce too high a level of cost and complexity. At the same time the invention avoids the disadvantages associated with an alternative approach, the ad-hoc approach in which a selected mobile unit performs the basic functions of an access point. In particular, in the ad-hoc approach, all mobile units need to be continually awake and a power saving mode PSP cannot be achieved.

In the particular embodiment described above, the invention is achieved by modifying a basic adapter card used in known systems so as to introduce basic AP capabilities. In particular the embedded system includes an association table allowing status information concerning up to five mobile units associated with the EAP to be maintained. The system also includes transmission queues allowing a PSP mode to be adopted. The detailed discussion of the various features of the system which are common with the conventional system, and the modifications that would be required, are set out in detail above allowing the skilled man to put the invention into practice. Particular applications which would benefit from the system according to the present invention include retail store applications and use in association with delivery trucks in a distribution system.

Turning to another aspect of the invention there is proposed an improvement to a multiple AP-roaming MU system. As discussed above, in such a system a mobile unit may be moved physically out of range, or out of optimum communicating range of a given AP in which case the MU may "roam" that is, reassociate with an AP offering better communication quality. In known systems, when the MU roams to a new AP, the new AP sends a message to the other AP's announcing this fact. If an MU roams between, say, three or four access points then a large number of messages will be transmitted by a path between the AP's to one another, tracking the movements of the MU, even if the MU does not actually send any packets. It will be seen that such an approach will increase power consumption, reduce the amount of time available to AP's for carrying out other tasks and slow down the system generally whilst transmitting information that may in fact be redundant.

Figure 6:
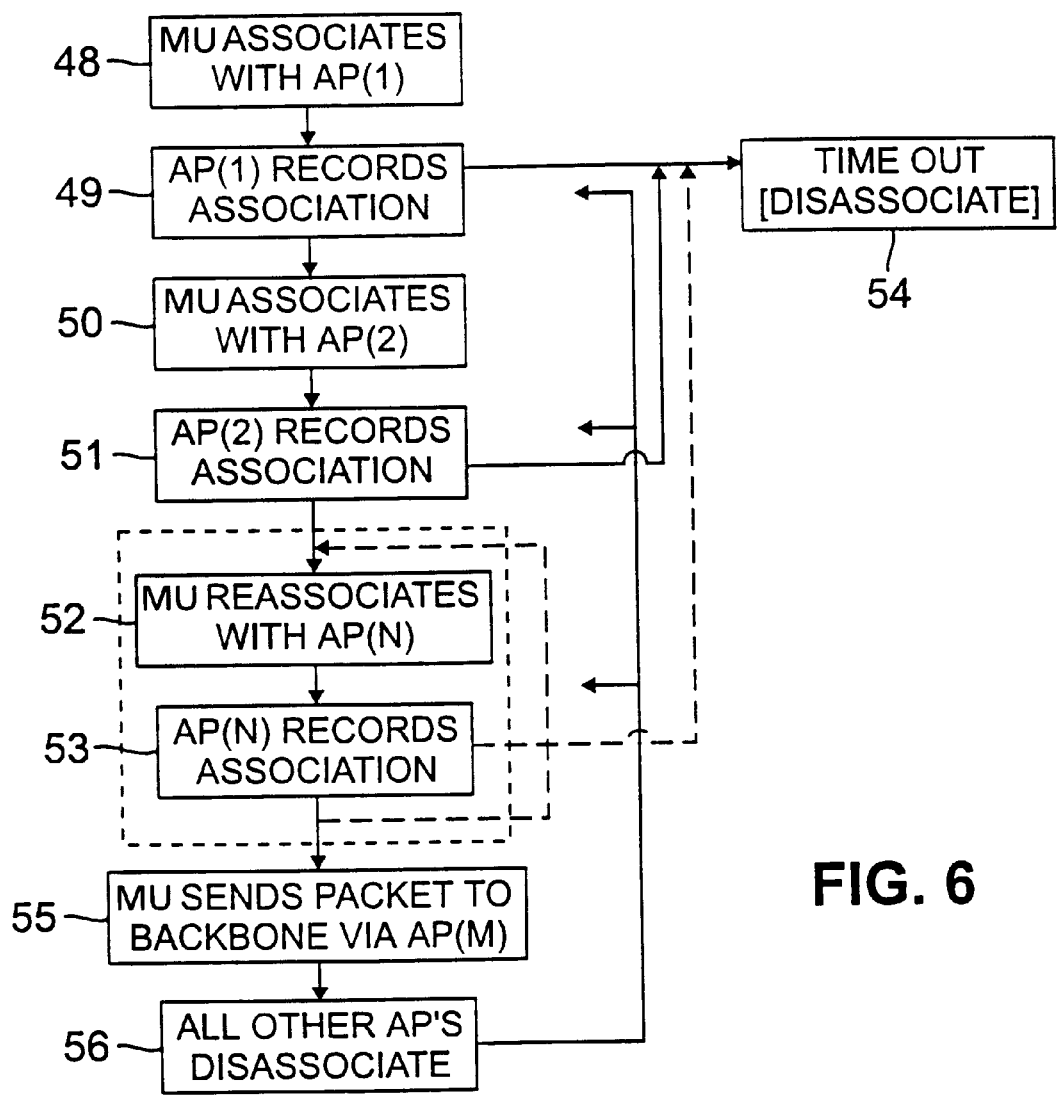
FIG. 6 is a flow chart illustrating the operation of another aspect of the present invention.

The present invention proposes an alternative approach illustrated in FIG. 6 in which once a mobile unit has reassociated with a new AP(2) (50) it is not deleted from the old AP(1) (48) database automatically, for example because of a message from the new AP that is has associated with the MU. In fact the new AP to which the MU has roamed does not carry out any steps when the roaming occurs except to add the unit to its database. If the MU does not send a packet after roaming, the old AP will not be informed of the roaming and will continue to believe that it owns the MU (49). Similarly, if an MU roams between a number of AP's (52), but never sends any packets that reach the Ethernet backbone, then there will be no AP—AP messages. All of the AP's will believe that the MU belongs to them (53), the MU can roam and remain with one or more AP's for any length of time, without sending a packet, and the AP's will continue to believe that they own the MU. In practice an AP may eventually remove the MU from its database for other reasons, for example if no packet is received within a given time then the MU may be timed-out (54), but this will not be on the basis of a message from another AP that the MU has roamed to it.

The situation will only change when the MU sends a packet that reaches the wired network Ethernet backbone (55). Only when the MU sends such a packet will the AP's find out that the MU no longer belongs to them and disassociate (56) (other of course than the AP with which the MU is currently associated). The corresponding reduction in redundant processing is of particular advantage in a wireless system where, because of the roaming of MU's, a large number of reassociations may take place which will give rise to large amounts of redundant processing in the prior art systems. The system of the invention may be viewed as a "source address" approach as roaming information is initiated by the source i.e. the MU rather than the destination, the AP.

An MU may notify all AP's of its roaming by sending any packet that will be forwarded to the backbone. The contents of such a packet would not be important, the source address of the packet would convey sufficient information as the currently associated AP will have received the packet. The MU may send the packet itself to notify the AP's of its roam.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

I claim:

1. A wireless communication system in which mobile units wirelessly communicate with a host computer or a computer network via access units, each mobile unit communicating with an access unit selected using an association protocol, the system comprising:

a first mobile unit (MU) capable of operating in a power-saving mode; and a second mobile unit (MU) comprising an access unit configured to support communication with the first mobile unit while the first mobile unit is operating in the power-saving mode, the access unit including a first data storage area comprising an association table for storing information concerning other mobile units in the system and a second data storage area for a message transmission queue.

2. A system as claimed in claim 1 in which the wireless communication comprises frequency hop spread spectrum communication.

3. A system as claimed in claim 1 in which the second MU includes a radio card incorporating the access unit.

4. A system as claimed in claim 3 arranged to operate according to a network messaging protocol specification.

5. A system as claimed in claim 1 in which the association table contains a predetermined number of entries, each entry being for an individual MU.

6. The system of claim 1 wherein the association table contains a predetermined number of entries, each entry being for an individual MU, and each entry containing at least the following fields:

an entry in use flag;

a power management mode flag;

a Power Save Polling (PSP) OK_to_Transmit flag;

the IEEE address of the MU;

the PSP station number assigned to the MU;

time of last interaction with the MU; and a count of the number of consecutive transmit failures for the MU.

7. A system as claimed in claim 6 in which the access unit in the second mobile unit is arranged to disassociate from an inactive mobile unit following a predetermined time-out period or a predetermined number of consecutive transmit failures.

8. A system as claimed in claim 1 wherein the access unit comprises a third data storage area for an access control list containing the IEEE addresses of MU's allowed to associate with the access unit.

9. A system as claimed in claim 1 in which the second storage area includes a transmit buffer queue for each MU operating in PSP mode.

10. A system as claimed in claim 1 in which the second data storage area includes a transmit queue for messages directed to MU's operating in continuously awake mode CAM.

11. A radio card for a mobile unit in a wireless communication system in which mobile units wirelessly communicate with a host computer or a computer network via access units, each mobile unit communicating with an access unit selected using an association protocol, the radio card including an access unit configured to support communication with another mobile unit while the other mobile unit is operating in a power-saving mode, the access unit having a first data storage area for an association table for storing information concerning other mobile units in the network and a second storage area including message transmit queue storage capability.

12. A mobile unit for a wireless communications network in which mobile units wirelessly communicate with a host computer or a computer network via access units, each mobile unit communicating with an access unit selected using an association protocol, the mobile unit including an adapter card having an access unit configured to support communication with another mobile unit while the other mobile unit is operating in a power-saving mode, and the access unit having a first data storage area for an association table for storing information concerning other mobile units in the network and a second storage area including message transmit queue storage capability.

13. A vehicle based distribution system including a wireless communications system in which mobile units wirelessly communicate with a host computer or a computer network via access units, each mobile unit communicating with an access unit selected using an association protocol, the system comprising:

a first mobile unit (MU) capable of operating in a power-saving mode; and a second mobile unit comprising an access unit configured to support communication with the first mobile unit while the first mobile unit is operating in the power-saving mode.

14. A retail store inventorying system including a wireless communications system in which mobile units wirelessly communicate with a host computer or a computer network via access units, each mobile unit communicating with an access unit selected using an association protocol, the system comprising:

a first mobile unit (MU) capable of operating in a power-saving mode; and a second mobile unit comprising an access unit configured to support communication with the first mobile unit while the first mobile unit is operating in the power-saving mode.

15. A method of operation of a wireless communication network in which mobile units wirelessly communicate with a host computer or a computer network via access units, each mobile unit communicating with an access unit selected using an association protocol, the method comprising:

a first mobile unit (MU) capable of operating in a power-saving mode; and a second mobile unit comprising an access unit configured to support communication with the first mobile unit while the first mobile unit is operating in the power-saving mode, wherein the second mobile unit stores address and status information concerning all other mobile units in a network in an association table, and stores messages for transmission in a message transmit queue.

16. A method as claimed in claim 15 in which the association table stores mobile unit association information and the access unit allows association with a mobile unit dependent on predetermined criteria and enters the mobile unit association information into the association table.

17. A method as claimed in claim 15 in which the access unit disassociates from a mobile unit if a time-out period is exceeded or if a predetermined number of successive transmit failures is exceeded.

18. A method as claimed in claim 15 in which the communications network conforms to a network addressing protocol specification, all mobile units transmit probe packets and the access unit transmits a probe response packet, transmission of the probe response packet being initiated at the interrupt level.

19. A method as claimed in claim 18 in which acknowledgement messages sent by the access unit, and the first fragment of a packet following a poll request from a mobile unit are initiated at the interrupt level.

20. A wireless communication system comprising a backbone, a plurality of access units and at least first and second mobile units, wherein:

the access units communicate with the backbone, the first mobile unit is capable of operating in a power-saving mode, at least one of the access units is embedded in a second mobile unit and is configured to support communication with the first mobile unit while the first mobile unit is operating in the power-saving mode, and when the first mobile unit roams from a first access unit to a second access unit, the first access unit is only notified of the roam once the first mobile unit issues a packet to the backbone.

21. A wireless communication system as claimed in claim 20 in which the first mobile unit issues a packet to the backbone containing only its source address.

* * * * *